(12) United States Patent
Shono

(10) Patent No.: US 6,741,284 B1
(45) Date of Patent: May 25, 2004

(54) SLR DIGITAL STILL CAMERA

(75) Inventor: Tetsuji Shono, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 09/392,777

(22) Filed: Sep. 9, 1999

(30) Foreign Application Priority Data

Sep. 25, 1998 (JP) .......................................... 10-272320

(51) Int. Cl.$^7$ .......................... G03B 13/00; H04N 5/232
(52) U.S. Cl. ...................................... 348/349; 348/341
(58) Field of Search ................................ 348/341, 349, 348/340, 335, 345

(56) References Cited

U.S. PATENT DOCUMENTS

| | | | |
|---|---|---|---|
| 4,599,653 A | * | 7/1986 | Kimura et al. .............. 348/346 |
| 4,730,200 A | | 3/1988 | Kitazawa |
| 6,041,195 A | * | 3/2000 | Honda et al. ................ 396/429 |
| 6,344,876 B2 | * | 2/2002 | Shiomi .................... 348/208.1 |

* cited by examiner

Primary Examiner—Wendy R. Garber
Assistant Examiner—Jason Whipkey
(74) Attorney, Agent, or Firm—Greenblum & Bernstein, P.L.C.

(57) ABSTRACT

An SLR digital still camera includes a quick return half mirror which allows object-carrying light, transmitted through a photographing lens, to be partly incident on a finder optical system and partly incident on an image pick-up device; a mirror driving device for driving the half mirror between a viewing position and a photographing position; a controller for calculating a displacement from a provisional focus position, based on an electrical signal obtained by a photo-electric conversion of the object-carrying light made incident on the image pick-up device through the half mirror when said half mirror is in the viewing position, to obtain a focusing position in which the photographing lens is focused on an object to be photographed when the half mirror is retracted from the photographing light path; a memory for storing said focus position; and a drive mechanism that moves one of the photographing lens and the image pick-up device in accordance with the focus position stored in the memory when the half mirror is moved to the photographing position upon a photographing operation, so that an in-focus image of the photographing lens is formed on the image pick-up device.

6 Claims, 3 Drawing Sheets

SLR DIGITAL STILL CAMERA

BACKGROUND OF THE INVENTION

1. Field of the Invention

The present invention relates to an SLR (single lens reflex) digital still camera.

2. Description of the Related Art

In a known SLR digital still camera, a stationary half mirror is provided in a photographing light path to allow object-carrying light, transmitted through a photographing lens, to be partly incident on a finder optical system and partly incident on a CCD. The stationary half mirror simplifies the structure of the SLR digital still camera but inevitably causes a loss of light quantity thereby. Consequently, if a photographing lens which collects a large quantity of light is used, inherent advantages thereof cannot be satisfactorily obtained upon photographing.

SUMMARY OF THE INVENTION

It is an object of the present invention to provide a SLR digital still camera using a half mirror, in which loss of light upon photographing can be reduced.

To achieve the object mentioned above, according to an aspect of the present invention, there is provided an SLR digital still camera including: a half mirror which allows object-carrying light, transmitted through a photographing lens, to be partly incident on a finder optical system and partly incident on an image pick-up device; a mirror driving device for driving the half mirror between a viewing position and a photographing position; wherein the half mirror is located in a photographing light path to allow object-carrying light, transmitted through the photographing lens, to be incident on a finder optical system when in the viewing position; and the half mirror is retracted from the photographing light path to allow the object-carrying light to be incident on the image pick-up device when in the photographing position; a controller for calculating a displacement from a provisional focus position, based on an electrical signal obtained by a photo-electric conversion of the object-carrying light made incident on the image pick-up device through the half mirror when the half mirror is in the viewing position, to obtain a focusing position in which the photographing lens is focused on an object to be photographed when the half mirror is retracted from the photographing light path; a memory for storing the focus position; and a drive mechanism that moves one of the photographing lens and the image pick-up device in accordance with the focus position stored in the memory when the half mirror is moved to the photographing position upon a photographing operation, so that an in-focus image of the photographing lens is formed on the image pick-up device.

Preferably, the memory stores the focus position of the photographing lens when a shutter button is depressed by a half-step, and the photographing lens is moved to the focus position by the drive mechanism when the shutter button is fully depressed.

Preferably, a program including a step to move the photographing lens to a provisional focus position is stored in the memory in which the object contrast detected by the image pick-up device attains an optimum level when the shutter button is depressed by a half-step, and a step that moves the photographing lens to the focus position from the provisional focus position.

Preferably, a program including a step to move the image pick-up device to a provisional focus position is stored in the memory in which the object contrast detected by the image pick-up device attains an optimum level when the shutter button is depressed by a half-step, and a step that moves the image pick-up device to the focus position from the provisional focus position.

Preferably, an object brightness is detected in accordance with an electric signal which is obtained by a photo-electric conversion of object-carrying light made incident on the image pick-up device through the half mirror in the viewing position.

Preferably, an object brightness is detected in accordance with an electric signal which is obtained by a photo-electric conversion of object-carrying light made incident on the image pick-up device in the viewing position, where the object-carrying light is not transmitted through the half mirror.

The present disclosure relates to subject matter contained in Japanese Patent Application No. 10-272320 (filed on Sep. 25, 1998) which is expressly incorporated herein by reference in its entirety.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
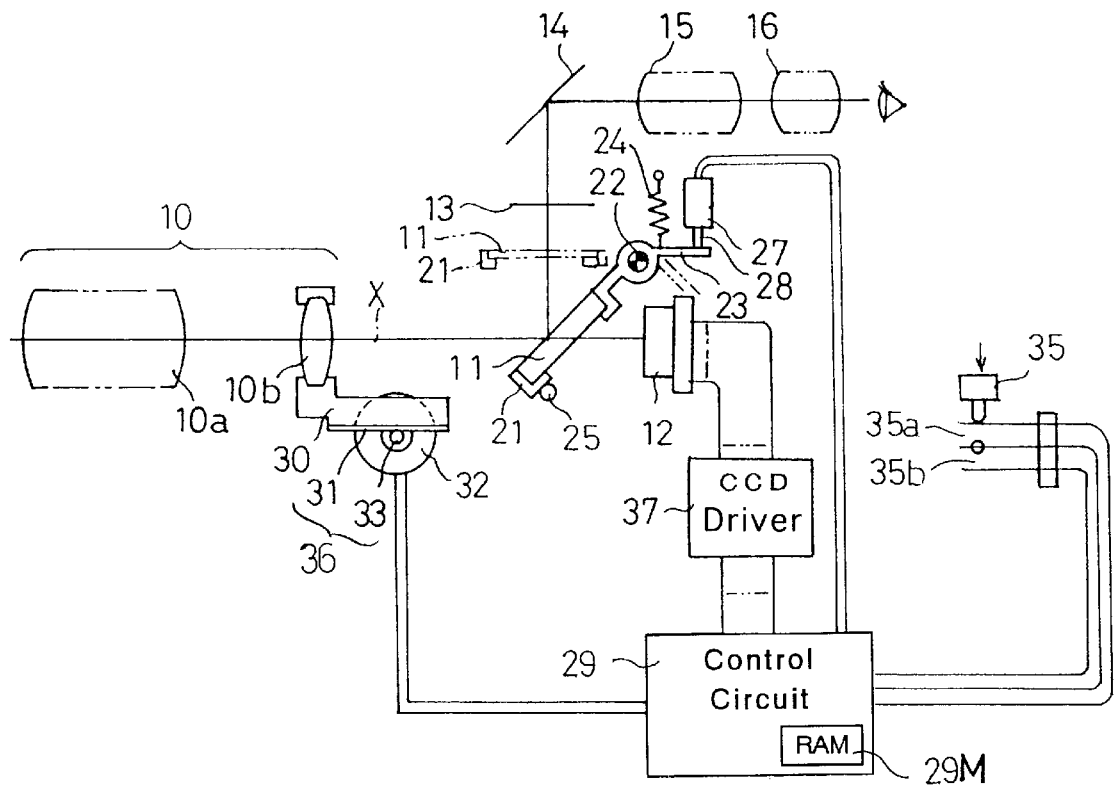
FIG. 1 is a conceptual circuit diagram of an embodiment of a SLR digital still camera according to the present invention.

FIG. 1 shows a conceptual view of an embodiment of an SLR digital still camera according to the present invention. Light passing through a photographing lens 10, which includes a stationary lens group 10a and a movable lens group 10b, is made incident on a quick return mirror 11 made of a half mirror (which will be referred to as a QR half mirror 11) which is normally located in a viewing position within a photographing light path. The light transmitted through the QR half mirror 11 is received by a CCD (image pick-up device) 12 which is located in a focal plane. The light reflected by the QR half mirror 11 is made incident on a finder optical system and is converged onto a focusing plate 13 located at a position optically equivalent to the focal plane to form an object image thereon. The object image formed on the focusing plate 13 is re-formed through a reflection mirror 14 and a relay lens 15, so that the re-formed image can be viewed through an eyepiece 16 as an erect image.

In other words, the QR half mirror 11 is provided in the photographing light path to allow object-carrying light, transmitted through a photographing lens, to be partly incident on the finder optical system and partly incident on the CCD.

The QR half mirror 11 is secured to a mirror seat 21 which is in turn pivoted at its upper end to a pivot shaft 22. The mirror seat 21 is provided with a drive arm 23 integral therewith, which extends outward from the pivot portion thereof. The drive arm 23 is biased by a tension spring 24 connected thereto. The tension spring 24 biases the mirror seat 21 (QR half mirror 11) to rotate in the anti-clockwise direction in FIG. 1 about the pivot shaft 22 (into the photographing light path). The limit of the rotation of the drive arm is defined by a stop pin 25. The limit of rotation corresponds to a viewing position in which the QR half mirror 11 is inclined at approximately 45 degrees with respect to the optical axis X of the photographing lens 10.

A mirror driving device which includes a plunger 28 and a solenoid 27 is provided adjacent to the drive arm 23. The solenoid 27 normally permits the mirror seat 21 to abut against the stop pin 25 via the tension spring 24. However, when the solenoid 27 is energized through a control circuit (controller) 29, the plunger 28 thereof pushes the drive arm 23 against the tension spring 24, so that the mirror seat 21 (QR half mirror 11) is moved upward to a retracted position out of the photographing light path, as indicated by phantom lines. Consequently, all the light rays passing through the photographing lens 10 is made incident on the CCD 12. Namely, the object light can be received by the CCD 12 without loss of light by the QR half mirror 11.

The movable focusing lens group 10b is held by a lens frame 30 which is provided with a rack 31 that extends in parallel with the optical axis. The rack 31 is engaged with a pinion 33 which is rotated in forward and reverse directions by an AF pulse motor 32. The AF pulse motor 32 is controlled by the control circuit 29. A half-depression switch 35a and a full-depression switch 35b are connected to the control circuit 29, which are turned ON by a shutter button 35. The CCD 12 is also connected to the control circuit 29 via a CCD driver 37.

Figure 3:
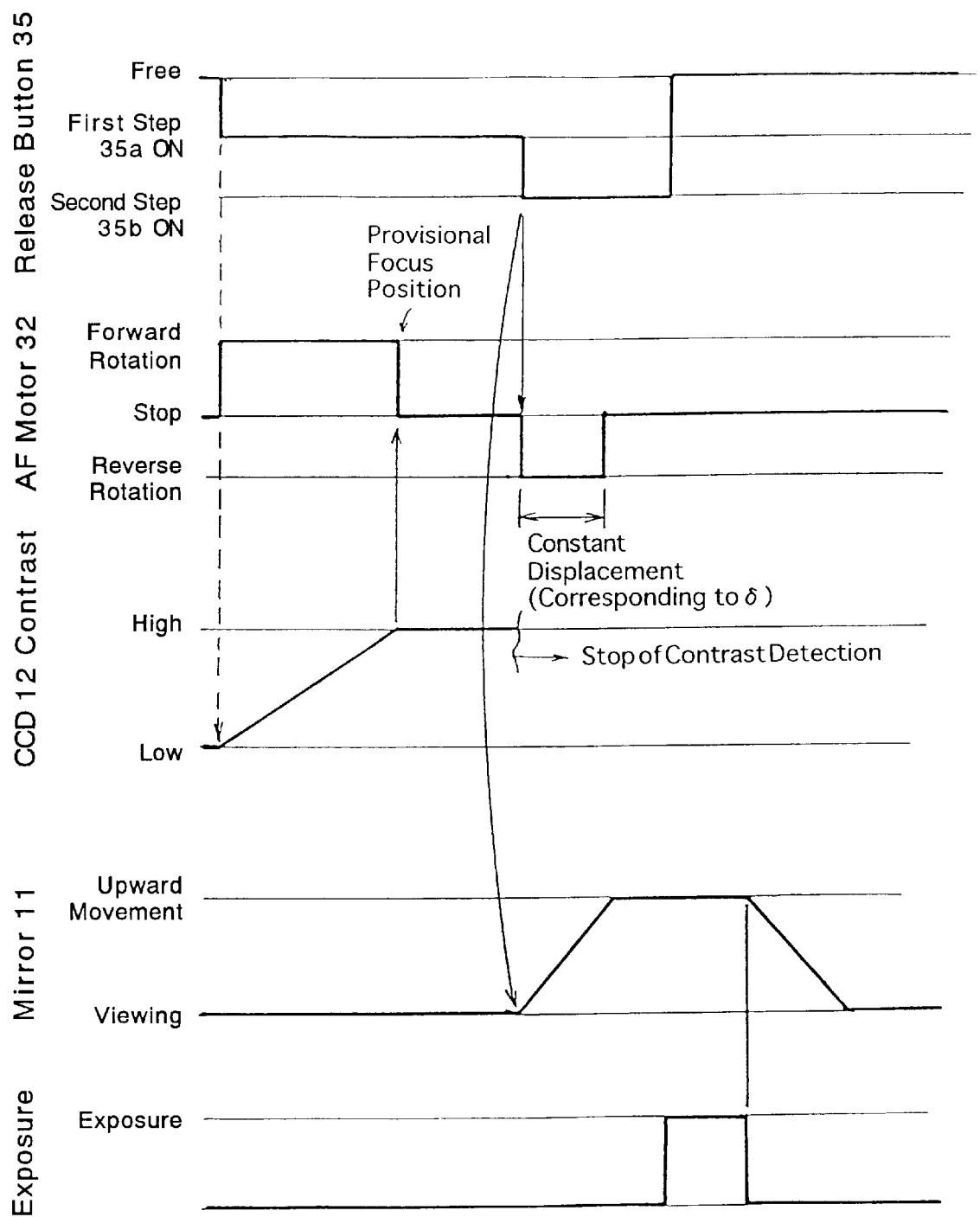
FIG. 3 is a timing chart of operations of an SLR digital still camera according to the present invention, by way of example.

The SLR digital still camera constructed as described above operates as follows. In FIG. 3 which shows the time chart of the operations, if the shutter button 35 is depressed by a half-step to turn the half-depression switch 35a ON, the control circuit 29 detects the contrast of the object-carrying light (object image) in accordance with an electric signal which is obtained by a photo-electric conversion of the object light received by the CCD 12. The detection method of the contrast using the output of the CCD is per se known. During the detection of the contrast, the control circuit 29 drives the AF pulse motor 32 to move the movable focusing lens group 10b in the optical axis direction via the pinion 33, the rack 31 and the lens frame 30 (the pinion 33 and the rack 31 constitute a drive mechanism 36). Consequently, the contrast of the object image formed on the CCD 12 changes, and hence the control circuit 29 drives the AF pulse motor 32 in accordance with a step in a program stored in the memory 29M to move the movable focusing lens group 10b to a provisional focus position, so that the contrast detection attains an optimum level (high). Since the provisional focus position is determined in accordance with the electric signal converted from the optical signal representing the object light transmitted through the QR half mirror 11 and received by the CCD 12, the provisional focus position is different from a focus position defined when the QR half mirror 11 is moved upward and retracted from the photographing light path.

Figure 2:
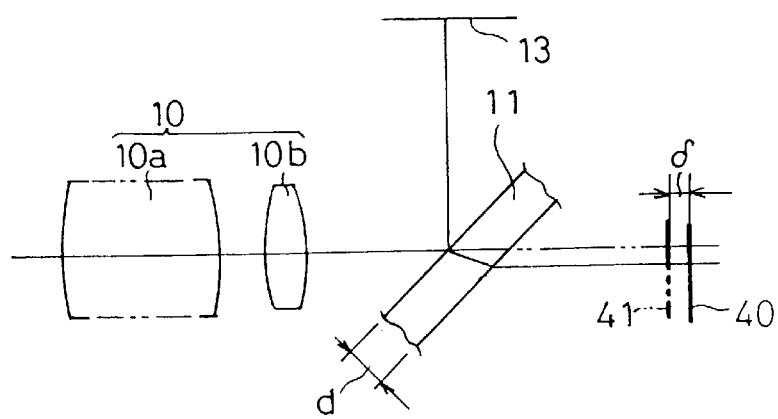
FIG. 2 is an enlarged view of a half mirror portion of the digital still camera shown in FIG. 1.

Namely, as can be seen in FIG. 2, an image position 40 is an image position wherein the object-carrying light passing through the QR half mirror 11 (whose thickness is d) is formed, and an image position 41 is an image position wherein the object-carrying light does not pass through the QR half mirror 11. The refractive index n of the QR half mirror 11 is greater than 1 (n>1), and accordingly, the image position 40 is always located farther from the QR half mirror 11 than the image position 41. Although no detailed explanation for calculation will be discussed herein, the distance δ between the image positions 40 and 41 is approximately equal to 0.2 mm (δ≈0.2 mm) wherein d=0.3 mm, and n=1.5.

The control circuit (controller) 29 calculates, and stores in a memory 29M, the displacement of the movable lens group 10b from the provisional focus position. The amount of displacement from the provisional focus position thus calculated, corresponds to the focus position in which the image is formed on the CCD 12 when the QR half mirror 11 is moved upward to the retracted position.

Upon a photographing operation, the shutter button 35 is fully depressed while the displacement is stored in the memory 29M (i.e., the full-depression switch 35b is turned ON), control circuit 29 activates the solenoid 27 to retract the QR half mirror 11 (mirror seat 21) from the photographing light path, and the AF pulse motor 32 is simultaneously driven in accordance with a step of a program stored in the memory 29M to move the movable focusing lens group 10b by the displacement δ (i.e., the movable focusing lens group 10b is moved to the focus position) stored in the memory 29M. After it is confirmed that the QR half mirror has been moved to the retracted position and that the movable focusing lens group 10b has been moved to the focus position, the image pickup operation by the CCD 12 is electrically carried out to pickup the image formed in the CCD 12. The image pickup operation by the CCD 12 is per se known.

The brightness data of the object can be detected in accordance with the output of the CCD 12. The detection of the object brightness can be carried out before or after the QR half mirror 11 is moved upward to the retracted position. If the CCD outputs brightness data before the QR half mirror 11 is moved upward, the output should be corrected based on the light transmittance of the QR half mirror 11.

Upon completion of the image pickup operation by the CCD 12, the control circuit 29 stops the power supply to the drive solenoid 27, and the movable focusing lens group 10b is moved (returned) to the retracted position which is in general at an infinite object distance position.

Figure 4:
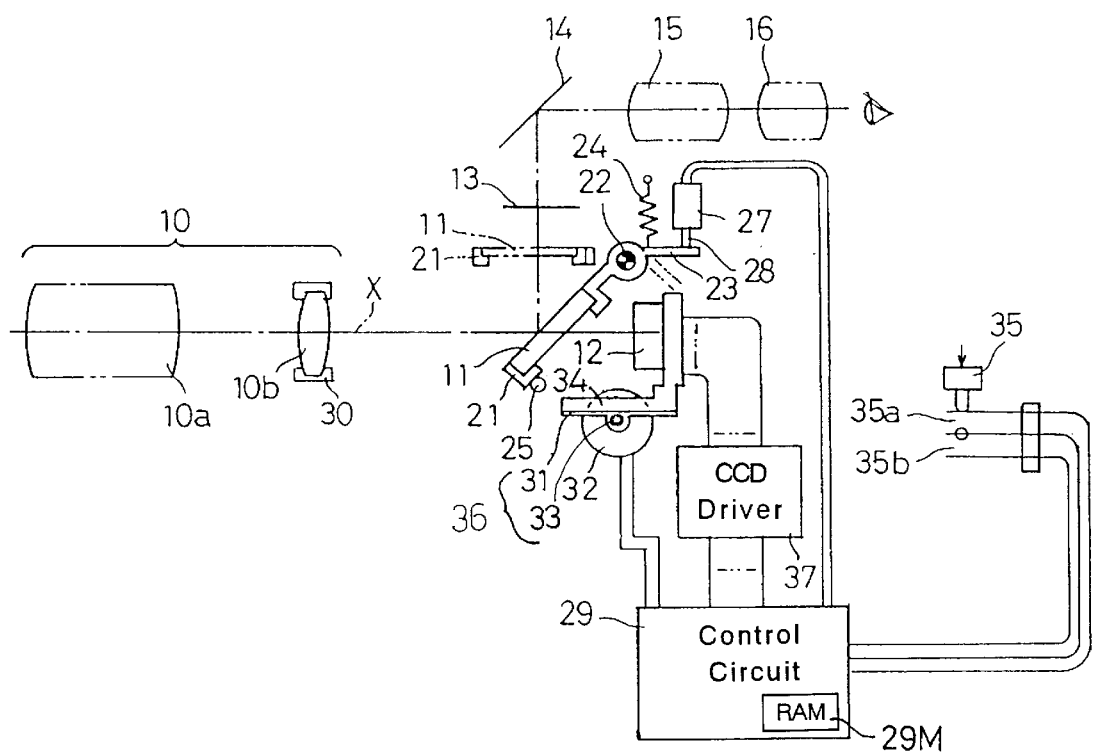
FIG. 4 is a conceptual circuit diagram of another embodiment of an SLR digital still camera according to the present invention.

FIG. 4 shows an SLR digital still camera of another embodiment according to the present invention. In this embodiment, the CCD 12 is moved to the focus position instead of the photographing lens 10.

The CCD 12 is held by a CCD frame 34 which is provided with a rack 31 that extends in parallel with the optical axis. The rack 31 is engaged by a pinion 33 which is rotated in forward and reverse directions by an AF pulse motor 32. The AF pulse motor 32 is controlled by the control circuit 29. A half-depression switch 35a and a full-depression switch 35b are connected to the control circuit 29, which are turned ON by a shutter button 35. Also, the CCD 12 is connected to the control circuit 29 through a CCD driver 37.

The SLR digital still camera constructed as above operates as follows. In FIG. 3 which shows the time chart of the operations, if the shutter button 35 is depressed by a half-step to turn the half-depression switch 35a ON, the control circuit 29 detects the contrast of the object-carrying light (object image) in accordance with an electric signal which is obtained by a photo-electric conversion of the object light received by the CCD 12. The detection method of the contrast using the output of the CCD is per se known. During the detection of the contrast, the control circuit 29 drives the AF pulse motor 32 to move the CCD 12 in the optical axis direction through the pinion 33, the rack 31 and the CCD frame 34 (the pinion 33 and the rack 31 constitute a drive mechanism 36). Consequently, the contrast of the object image formed on the CCD 12 changes, and hence the control circuit 29 drives the AF pulse motor 32 in accordance with a step of a program stored in the memory 29M to move the CCD 12 to a provisional focus position, so that the contrast detection attains an optimum level (high). Since the provisional focus position is determined in accordance with the electric signal converted from the optical signal representing the object light transmitted through the QR half mirror 11 and received by the CCD 12, the provisional focus position is different from the focus position defined when the QR half mirror 11 is moved upward and is retracted from the photographing light path.

Namely, as can be seen in FIG. 2, an image position 40 is an image position wherein the object-carrying light passing through the QR half mirror 11 (whose thickness is d) is formed, and an image position 41 is an image position wherein the object-carrying light does not pass through the QR half mirror 11. The refractive index n of the QR half mirror 11 is greater than 1 (n>1), and accordingly, the image position 40 is always located farther from the QR half mirror 11 than the image position 41. Although no detailed explanation for calculation will be discussed herein, the distance δ between the image positions 40 and 41 is approximately equal to 0.2 mm (δ≈0.2 mm) wherein d=0.3 mm, and n=1.5.

The control circuit (controller) 29 calculates, and stores in a memory 29M, the displacement of the CCD 12 from the provisional focus position. The amount of displacement from the provisional focus position thus calculated, corresponds to the focus position in which the image is formed on the CCD 12 when the QR half mirror 11 is moved upward to the retracted position.

Upon a photographing operation, the shutter button 35 is fully depressed while the displacement is stored in the memory 29M (i.e., the full-depression switch 35b is turned ON), the control circuit 29 activates the solenoid 27 to retract the QR half mirror 11 (mirror seat 21) from the photographing light path, and the AF pulse motor 32 is simultaneously driven in accordance with a step of a program stored in the memory 29M to move the CCD 12 by the displacement δ (i.e., the CCD 12 is moved to the focus position) stored in the memory 29M. After it is confirmed that the QR half mirror has been moved to the retracted position and that the CCD 12 has been moved to the focus position, the image pickup operation by the CCD 12 is electrically carried out to pickup the image formed in the CCD 12. The image pickup operation by the CCD 12 is per se known.

The brightness data of the object can be detected in accordance with the output of the CCD 12. The detection of the object brightness can be carried out before or after the QR half mirror 11 is moved upward to the retracted position. If the CCD outputs brightness data before the QR half mirror 11 is moved upward, the output should be corrected based on the light transmittance of the QR half mirror 11.

Upon completion of the image pickup operation by the CCD 12, the control circuit 29 stops the power supply to the drive solenoid 27, and the CCD 12 is moved (returned) to the retracted position which is in general at an infinite object distance position.

The present invention can be equally applied to an SLR digital still camera in which a pentagonal prism is used in place of the reflection mirror 14 and the relay lens 15.

As may be understood from the above discussion, according to the present invention, an SLR digital still camera in which no or little loss of light upon photographing occurs can be achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An SLR digital still camera comprising:
   a half mirror which allows object-carrying light, transmitted through a photographing lens, to be partly incident on a finder optical system and partly incident on an image pick-up device;
   a mirror driving device for driving the half mirror between a viewing position and a photographing position; wherein said half mirror is located in a photographing light path to allow object-carrying light, transmitted through the photographing lens, to be incident on a finder optical system when in said viewing position; and said half mirror is retracted from the photographing light path to allow said object-carrying light to be incident on the image pick-up device when in said photographing position;
   a controller for calculating a displacement from a provisional focus position, based on an electrical signal obtained by a photo-electric conversion of the object-carrying light made incident on the image pick-up device through the half mirror when said half mirror is in the viewing position, to obtain a focusing position in which the photographing lens is focused on an object to be photographed when the half mirror is retracted from the photographing light path;
   a memory for storing said focus position; and
   a drive mechanism that moves one of the photographing lens and the image pick-up device in accordance with the focus position stored in the memory when the half mirror is moved to the photographing position upon a photographing operation, so that an in-focus image of the photographing lens is formed on the image pick-up device.

2. An SLR digital still camera according to claim 1, wherein said memory stores the focus position of the photographing lens when a shutter button is depressed by a half-step, and the photographing lens is moved to the focus position by the drive mechanism when the shutter button is fully depressed.

3. An SLR digital still camera according to claim 1, wherein a program including a step to move the photographing lens to a provisional focus position is stored in said memory in which the object contrast detected by the image pick-up device attains an optimum level when the shutter button is depressed by a half-step, and a step that moves the photographing lens to the focus position from the provisional focus position.

4. An SLR digital still camera according to claim 1, wherein a program including a step to move the image pick-up device to a provisional focus position is stored in said memory in which the object contrast detected by the image pick-up device attains an optimum level when the shutter button is depressed by a half-step, and a step that moves the image pick-up device to the focus position from the provisional focus position.

5. An SLR digital still camera according to claim 1, wherein an object brightness is detected in accordance with an electric signal which is obtained by a photo-electric conversion of object-carrying light made incident on the image pick-up device through the half mirror in the viewing position.

6. An SLR digital still camera according to claim 1, wherein an object brightness is detected in accordance with an electric signal which is obtained by a photo-electric conversion of object-carrying light made incident on the image pick-up device with the half mirror in the photographing position, where said object-carrying light is not transmitted through the half mirror.

* * * * *